E. SECOR.
Hanging-Gates.
No. 142,522.  Patented September 2, 1873.
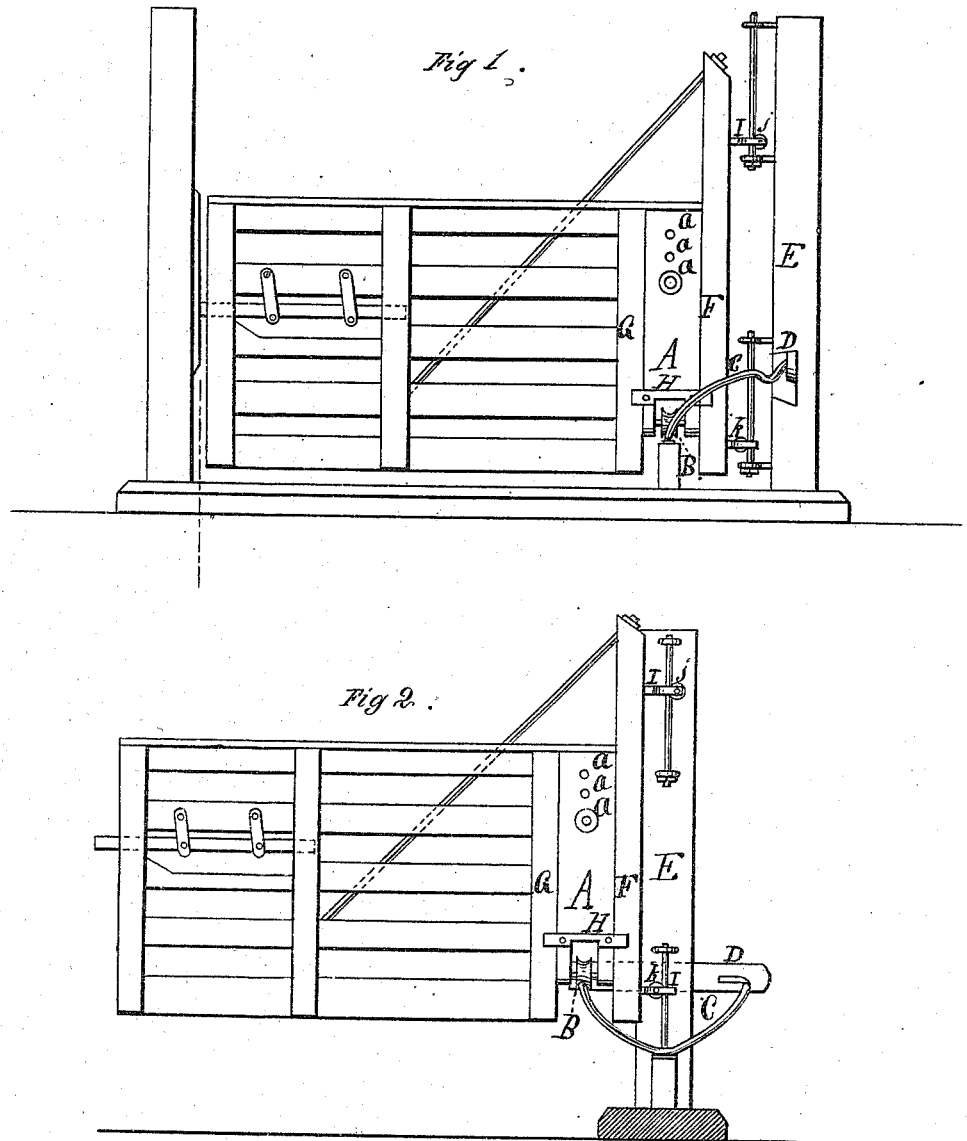
Witnesses:
S. H. Wheeler
R. B. Wheeler
Inventor.
Eli Secor.

UNITED STATES PATENT OFFICE.

ELI SECOR, OF NILES, MICHIGAN.

IMPROVEMENT IN HANGING GATES.

Specification forming part of Letters Patent No. 142,522, dated September 2, 1873; application filed June 17, 1873.

*To all whom it may concern:*

Be it known that I, ELI SECOR, of Niles, Berrien county and State of Michigan, have invented a new Method of Hanging Gates, of which the following is a specification:

The object of this invention is to reduce the friction, and thereby secure greater certainty in shutting the gate by its own gravity, and in making the gate adjustable vertically; and my invention consists in providing a movable block carrying at its lower end a large friction-roller, which traverses an inclined plane, and bears the entire weight of the gate, while the upper end of the block is bifurcated, works astride the upper bars of the gate, and has several small holes for the reception of a pin, which passes through or beneath one of the bars, thus allowing a considerable degree of vertical adjustability. To accomplish these purposes, I construct the gate and hinges as hereinafter described and shown in the accompanying drawing, in which—

Figure 1 is a side view, showing the gate shut; and Fig. 2 shows the gate wide open.

In the drawing, A represents a movable block. This block is provided at the lower end with the friction-roller B, and its upper end is bifurcated, and works astride of the upper bars of the gate, and has several small holes, *a a a*, for the reception of a pin. This pin passes through or beneath one of the bars of the gate, and on it the gate rests. When said pin is in the uppermost one of the holes the gate will be sufficiently elevated to allow of the passage of hogs and other small animals under it, while larger animals cannot pass through. The friction-roller B sustains the entire weight of the gate, and traverses the spiral inclined plane C as the gate is opened in either direction. This spiral inclined plane is supported at the middle in the line of the gate-way by a post embedded in the ground, and the elevated ends are supported by the cross-bar D. This cross-bar is let into the front side of the rear gate-post E. One or more of the lower bars of the gate are cut away, so as to allow the roller B to work up. The bifurcated block A works against the rear upright F of the gate-frame, and is prevented from moving laterally by means of the uprights G and the iron strap H. I also, preferably apply friction-rollers to the loop or straps I I, which embrace the pintles of the gate-hinge. The upper one of these rollers works against the back side of the upper pintle, and the lower friction-roller works against the front side of the lower pintle; and as the spiral inclined plane C causes the gate to rise on being opened in either direction, this gives a rolling contact between the friction-roller and the pintles, materially reducing the friction of the hinge. I construct my gate otherwise like gates in common use, and my improvement may be applied to ordinary gates, with slight but obvious changes.

Having thus fully described my invention, what I claim as new, and desire to secure by Letters Patent, is—

The adjustable bifurcated block A, in combination with the friction-roller B and spiral inclined plane C, substantially as and for the purposes hereinbefore set forth.

ELI SECOR.

Witnesses:
R. B. WHEELER,
S. H. WHEELER.